United States Patent [19]

Laiw

[11] Patent Number: 4,777,055

[45] Date of Patent: Oct. 11, 1988

[54] PROCESS FOR PREPARATION OF A PRESERVE OF RADISH

[75] Inventor: Ah L. Laiw, Taipei, Taiwan

[73] Assignee: Axle Plan Corporation, Tokyo, Japan

[21] Appl. No.: 887,683

[22] Filed: Jul. 21, 1986

[30] Foreign Application Priority Data

Jul. 23, 1985 [JP] Japan ................................ 60-162558

[51] Int. Cl.$^4$ ................................................ A23B 7/16
[52] U.S. Cl. .................................... 426/267; 426/270; 426/310; 426/615
[58] Field of Search ............... 426/615, 310, 102, 267, 426/270, 481

[56] References Cited

U.S. PATENT DOCUMENTS

| | | | |
|---|---|---|---|
| 2,946,691 | 7/1960 | Sugitani | 426/310 |
| 3,578,466 | 5/1971 | Luckmann | 426/267 |
| 4,202,912 | 5/1980 | Kim | 426/270 |
| 4,614,655 | 9/1986 | Hashens et al. | 426/49 |

FOREIGN PATENT DOCUMENTS

| | | | |
|---|---|---|---|
| 12693 | 4/1976 | Japan | 426/615 |
| 9744 | 3/1977 | Japan | 426/615 |
| 12263 | 6/1977 | Japan | 426/615 |
| 41348 | 4/1979 | Japan | 426/615 |
| 208968 | 12/1982 | Japan | 426/615 |
| 116649 | 7/1983 | Japan | 426/615 |

*Primary Examiner*—Donald E. Czaja
*Assistant Examiner*—Carolyn Paden
*Attorney, Agent, or Firm*—Armstrong, Nikaido, Marmelstein & Kubovcik

[57] ABSTRACT

A process for preparing preserve of radish which comprises cleanly washing the raw material, dressing the raw material, shape-retaining by plasticization, heat treating for deodorization, impregnating with sugar solution in progressive stages, and preserve of radish prepared according to the above process.

1 Claim, No Drawings

PROCESS FOR PREPARATION OF A PRESERVE OF RADISH

BACKGROUND OF THE INVENTION

1. Field of the Invention

This invention relates to a novel preserve of radish which has heretofore never been prepared and a process for preparation thereof. More particularly, this invention relates to a preserve of radish whose external appearance and form, needless to say, taste and mouthfeel, have been improved and elevated to such a high level as adapted for use as accessories of cakes of highgrade by removing the peculiar tang of the radish itself by deodorization treatment and at the same time improving the texture of the radish by the plasticization of the structure and further by sugaring the resulting product in progressive stages, and the process for preparation of such a novel preserve.

2. Description of the Prior Art

Radish plant is classified in the family Cruciferae, and the roots and leaves are edible, in some plants the roots grow to a giant size.

Radish contains by nature a slightly pungent-tasting ingredient, which constitutes the peculiar tang of the radish in coexistence with the grassy-smelling substance which is also characteristic to radish. The pungent-tasting substance per se of the radish, which resembles those of wasabi (Japanese horse-radish), pulverized mustard, etc. stems chiefly from butyl iso-thiocyanate, allyl iso-thiocyanate, etc.

The tang of wasabi is in general highly valued as meeting a unique taste, while the tang of radish usually becomes a good sharp one when salt is added thereto. The tang and the grassy-smell of radish regarded as giving a peculiar odor are both characteristic to radish, but the harmoney between them and salt is very favorable, and thus, if radish is made into salted product the peculiar odor may no longer be regarded as a malodor, and instead it will become a good taste pleasing everybody.

In the Continent of Chine and Formosa there is known for a long time waxgourd sugar (tung kua tang) which is made from waxgourd, and this raw material, waxgourd, is the one whose taste is most lacking any undesirable peculiarity among the various kinds of melons. But, when it is processed and obtained as a finished product, the tang characteristic to the raw material is recovered leaving the original taste of the waxgourd sugar. The peculiar tang of this product is not disliked among Chinese society, and rather liked. From old times, the waste liquor from the manufacture of waxgourd sugar has never been discarded, and it was further concentrated and stored, until it is diluted and used as a refreshing drink. Nowadays, without making the waxgourd sugar, the concentrated solution is made directly from waxgourd, and the concentrated product for the exclusive use as the refreshing drink is commercially available.

When comparing the characteristics of the waxgourd sugar with those of the product of this invention, there is found remarkable differences between them. Above all, in comparison of the tang, the tang of the waxgourd itself harmonizes with sugary material, giving a taste as if it were maple flavor, whereas, the tang of radish will never become acceptable by any one unless the deodorization treatment is carried out.

The deodorization treatment was for the first time devised for the raw material, radish, in this invention, and by virtue of this treatment not only could the commercial value of the preserve of radish be brought about, but also an unexpected improvement in the texture of the radish was achieved in that the fragile texture is converted into a firmly tightened texture, and as the result the object of this invention could be accomplished by a signal effort.

From old times ginger which contains gingerol as the chief ingredient has been preserved in sugar, but the "tung chiang" prepared in China has a relatively sharp flavor remained. In the preparation of the "tung chiang" deodorization is unnecessary, and the commercially available ginger ale is considerably sharp. thus the sharp flavor of ginger is being fully utilized in many fields of processed foodstuffs.

Several examples have been described as above, and from these it may be understood that how difficult it is to prepare the preserved food where the raw material is radish, and up to the present the preserve of radish is the first to be prepared by applying the deodorization treatment. Therefore, this treatment is the essential point of this invention.

SUMMARY OF THE INVENTION

It is an object of this invention to provide preserve of radish prepared by the following steps:
(A) cutting or forming to the desired shape carefully selected radish which was beforehand washed with water and peeled;
(B) impregnating the product obtained in the foregoing step (A) with a solution or suspension of a calcium salt;
(C) subjecting the product impregnated in the foregoing step (B) to deodorization treatment in boiling water; and
(D) after the removal of the treating solution used in the foregoing step (C), impregnating the thus treated product with a solution containing sugar so that the sugaring may be achieved in progressive stages.

It is a further object of this invention to provide a process for preparation of preserve of radish, which comprises the following steps:
(A) the step of cutting or forming to the desired shape carefully selected radish which was beforehand washed with water and peeled;
(B) the step of impregnating the product obtained in the foregoing step (A) with a solution or suspension of calcium salt;
(C) the step of subjecting the product impregnated in the foregoing step (B) to deodorization treatment in boiling water; and
(D) the step of removing the treating solution used in the foregoing step (C), and impregnating the thus treated product with a solution containing sugar so that the sugaring may be achieved in progressive stages.

DETAILED DESCRIPTION AND THE PREFERRED EMBODIMENTS OF THE INVENTION

In an attempt to prepare a preserved food using the radish as the raw material, the present inventor made an investigation on the preservation of the radish in sugar, and as the result of a preliminary experiment it was found that when sugar is added to the radish, an extremely inharmonious odor of radish is emitted. Based on the first information thus obtained, the deodorization of the radish was for the first time taken up as a new technical problem. In the preparation of salted radish the deodorization is unnecessary, whereas in the preparation of the preserve in sugar it is an indispensable requirement.

The preserves prepared from old times are those which were obtained using fruits as the raw material, and therefore, in any process for the preparation of these preserves the deodorization step has never been applied even though the decoloration step has been applied.

When a green radish is mashed, the paste-like mashed radish has a sharp tang, but the tang disappears the instant heat is applied. Since this was confirmed as the second information, next, the process for deodorization by heat treatment began to be considered. But, the raw material which was treated by the conventional method to increase the plasticity, shows that it has a structure somewhat resembling glass, and as the peculiar tang is brought to the condition as if it were occluded in the glass-like structure, this renders it very difficult all the more to dissolve out the peculiar tang. This fact was regarded as the third information, and then by a still further new experiment it was confirmed that even when the treating temperature reaches the boiling point of water or higher, the shape-retaining property of the raw material is still remained, and the fourth information was obtained from this. Thus, considering that the time of the heat treatment should be controlled depending on the size of the formed product obtained from the raw material there was obtained by a single effort a further progressed step which can have a double effect of the deodorization and the improvement in the texture.

This invention could be embodied by providing a novel process in conformity with the inherent properties of the raw material on the basis of the above described informations 1–4, and by the special techniques that cannot be seen in the conventional methods used for fruits and requires still more efforts than its necessary in such methods.

As the serious difficulties which should be absolutely overcome and hence which required a great many novel efforts in this invention may be mentioned:

i. No peculiar tang should remain in the final products at least to an extent comparable to fruits preserves.
ii. Since the radish contains more than 94% of water, the knack of the treatment is found in that the shape retention and the break of the structure should be properly controlled.
iii. Since the effect of deodorization cannot be expected in the step of impregnation with sugar solution, the deodorization should always be carried out prior to the step of impregnation with sugar solution.
iv. The product should have a properly compact and properly firmed structure.

If the above described four points of technical difficulties could be overcome by the effort of this invention, a great many advantages as shown below will be obtained in addition to the excellent characteristics of the radish itself.

1. Since the base material is transparent, the preserves may be evenly dyed any shade of color whatever with high clearness.
2. Since the base material has already deodorized, the preserve may be adapted for any flavoring, which matches well the forming and coloration of the product.
3. Since the base material has already been made tasteless, the preserve can be made to have any taste at will.
4. The texture of the final product is not so fragile as that of "kanten" (Gelidium jelly), but as firm as a jelly cake, having a drained cherry-like feel.
5. Since the volume of the base material is large, it is possible to form the final product into any shape desired by the use of a forming device specially designed in this invention. For instance, by the use of (1) a pundher, (2) a borer, (3) an extruder, (4) a slitter, etc. there may be formed a great diversity of shapes such as spherical, circular, square, rhombic, heart-shaped, star-shaped, leaf-shaped, tartlet-shaped, various flower-shaped, (e.g., sakura, ume, crysamnthemum), animal-shaped, carton-shaped, fruit-shaped, granular, etc., thus rendering it possible to practice the process of this invention at an artistic level remarkably elevated.

The novel process of this invention, which was newly designed and accomplished by overcoming the above described technical difficulties comprises the following steps: (1) the step of cleanly washing the raw material, (2) the step of dressing the raw material, (3) the step of shape-retaining by plasticization, (4) the step of heat treating for deodorization, (5) the step of impregnating with sugar solution in progressive stages, and (6) the step of finishing the product, etc.

Following the above described order, in the step of (2) after passing through the step of (1), the peeling and the forming are required in the case of radish differing from the case of fruits wherein all that is required is the core removal. The sphere of utilization can be expanded by carrying out the forming, and the diversification of the products can also be promoted under the improved artistic conditions.

The step of shape-retaining of (3) involves an immersion in a solution or suspension of a calcium salt, in which case the use of a light or precipitated calcium salt is convenient. The effective concentration of the calcium is above 1%, and in order to promote the rate of immersion, it is necessary to increase the concentration though depending also on the size of the radish. The step of (4) is a heat treatment for deodorization which is carried out only for the preserve of radish, and unnecessary for the preserve of fruits. In this step the softening of the plasticized structure takes place beginning at the outer side, so that by measuring the degree of the softening by fingering or by means of a measuring instrument, one can find the time of ending this step. For instance, in the case where the product is of a size of 1 cm square, the object of reforming the structure can be achieved by 4 minutes of boiling. If the structure is softened by breakage, not only can the peculiar tang be leached away, but also the penetration of the surgary material can be remarkably promoted. As the result, the thus treated product is properly plasticized to have somewhat firmed compactness. Thus, this step is the most important technical basis of the process of this invention which could completely solve the difficulties in the manufacture. By virtue of this step the product of this invention could be so much improved in the texture that it can be dealt with a high-grade product, having a better mouth-feel. (5) is the step of impregnating with sugar solution, and the sugars used include sucrose, glucose, fructose, maltose, or other edible sugars. These are used in admixture depending on the particular use.

The fundamental principle of the step of deodorization which is the kernel of the procss throughout all the steps of this invention having multiple effects is found in that heat causes the breakage of the structure, and by this breakage the success of the process is brought about. In order to ensure the success it is essential to repeatedly renew the water during the boiling. The effect of this repetition is extremely remarkable as the complete deodorization can be achieved. Thus, these procedures have not only an effects such that the structure is moderately firmed and the penetration of the sugar solution is promoted, and so on, so that the final product passed through all these steps is not only improved in the physical and chemical properties but also much beutified in the external appearance.

A variety of shaped products of this invention which has many economical advantages can be used as such for the decoration of cakes and cookies because of their highly acceptable appearance, and as they regale not only one's eyes with the appearance but also one's tongue with the good taste, it is believed that they will soon enjoy wide-spread popularity with steady-going development as the accessories of cakes of higher grade.

Although this invention was initially very doubtful of its success, it could be successfully accomplished at last after many years of efforts accumulated since the occurrence of the conception. With reference to Examples this invention will be more concretely explained, but it should be understood that this invention is not limited thereto so far as it does not depart from the spirit and scope of this invention.

EXAMPLE 1

Carefully selected one kind of radish, "da mei hua", *Raphanus sativus L.*, produced in Formosa was used as the raw material, and after washing with water, it was peeled, and cut in round slices, 6 cm thick, which were formed into spherical shape of the size as large as a cherry by means of a semicircular puncher of special make. The balls thus obtained were placed in and impregnated for 8 hours with a solution of calcium salt beforehand prepared (containing 4% of light calcium carbonate) so as to be plasticized and develop shape-retaining property, and then boiled for 15 minutes in boiling water, while renewing the water three times repeatedly, whereby the deodorization was sufficient, and the texture was also moderately firmed. Following this, the above treated product was impregnated with a sugar solution at 30° Brix (sucrose 50%, corn syrup 50%) colored with a red dye. During the impregnation a small amount of almond essence was added as a flavoring, and the sugaring was continued in progressive stages until the degree Brix reached finally 75°, after which the sugar solution adhering on the outer layer was removed, and a coating was applied on said outer layer by glacer treatment to give the finished product.

EXAMPLE 2

The radish, which was washed with water and peeled after careful selection, was cut in round slices, 0.6 cm thick, and formed by a specially made forming machine having a crysanthemum shape, and then placed in a suspension containing 3% of calcium carbonate which was beforehand prepared, and therein impregnated for 6 hours with said suspension, so as to develop the shape-retaining property. The thus treated product was next boiled for 12 minutes in boiling water while renewing the water twice, whereby the deodorization was sufficient and the texture was also firmed. Following this, the resulting product was impregnated with a sugar solution at 30° Brix (sucrose 60%, corn syryp 40%) colored with a yellow dye. During the impregnation a small amount of vanilla essence was added, and the sugaring was continued in progressive stages until the degree Brix reached finally 75°, after which the sugar solution on the outer side was removed, and the finished product was obtained by glacer treatment.

EXAMPLE 3

The radish which was pretreated according to Example 2 was cut in round slices, 0.4 cm thick, formed by a specially made extruder having a star shape, impregnated for 6 hours with a suspension containing 3% of calcium carbonate so as to develop the shape-retaining property, and then boiled for 10 minutes in boiling water while renewing the water twice for carrying out deodorization and firming of the texture. After the deodorization was complete, the resulting product was impregnated with a sugar solution at 30° Brix (sucrose 70%, glucose 30%) colored green and scented with melon flavor, and the sugaring was continued in progressive stages until the degree Brix reached finally 75°, after which the finished product was obtained by glacer treatment according to Example 2.

EXAMPLE 4

The radish which was pretreated according to Examples 1, 2, and 3 was cut in round slices, 0.4 cm thick, formed into 0.4 cm square 4y the use of a specially made slitter, impregnated for 5 hours with a suspension containing 3% of calcium carbonate so as to develop the shape-retaining property, and then boiled for 10 minutes in boiling water while renewing the water twice, for carrying out deodorization and firming of the texture. After the deodorization was complete, the resulting product was impregnated with a sugar solution at 30° Brix (sucrose 80%, corn syrup 20%) colored with a violet dye (red and blue) and added with grape flavor, and the sugaring was continued in progressive stages until the degree Brix reached finally 75°, after which there was obtained a finished product resembling raisins by glacer treatment in the same manner as the above described examples.

The external appearance and the taste of the respective finished products obtained in the above described examples are shown in the following Table 1.

TABLE 1

| Example No. | External appearance | Taste |
| --- | --- | --- |
| 1 | Red drained cherry | Almond |
| 2 | Yellow crysanthemum | Vanilla |
| 3 | Green star-shaped | Melon |
| 4 | Violet raisins | Grape |

The preserve of this invention can be obtained in a diversity of forms as above, and moreover, in response to the particular taste and particular demand more tasteful and more refined products can be produced. Since in the field of the baking industry wherein all things are now becoming highly artistic, the demands are more and more rising to high levels, those which can meet them should be more super in the external appearance as well as in the contents.

To summarize the foregoing, in this invention radish was for the first time taken up as the raw material, and by deeply understanding the characteristics of the radish, there was found a novel process which can make the most of its excellent quality, and when the effort devoted to firmly establish its practicality overcome all the difficulties in the manufacture this invention could be achieved.

What is claimed is:

1. A process for preparation of preserve of radish which comprises the following steps:
   (A) cutting or forming to a desired shape carefully selected radish which was beforehand washed with water and peeled;
   (B) impregnating the product obtained in the foregoing step (A) with a solution or suspension of a calcium salt for a sufficient time and at a sufficient concentration of calcium salt to plasticize the radish;
   (C) subjecting the product impregnated in the foregoing step (B) to deodorization treatment in boiling water for a time period sufficient to deodorize the impregnated product while repeatedly renewing the water; and
   (D) after the removal of the treating solution used in the foregoing step (C), impregnating the thus treated product with a solution containing sugar for a sufficient time and at a sufficient sugar concentration to sweeten the product, so that the sugaring may be achieved in progressive stages.

* * * * *